(12) United States Patent
Hippenmeyer et al.

(10) Patent No.: US 7,667,185 B2
(45) Date of Patent: Feb. 23, 2010

(54) OPTOELECTRONIC SENSOR

(75) Inventors: Heinrich Hippenmeyer, Freiamt (DE);
Ulrich Zwölfer, Kenzingen (DE);
Stephan Schmitz, Freiburg (DE)

(73) Assignee: Sick AG, Waldkirch (DE)

( * ) Notice: Subject to any disclaimer, the term of this patent is extended or adjusted under 35 U.S.C. 154(b) by 0 days.

(21) Appl. No.: 11/976,508

(22) Filed: Oct. 25, 2007

(65) Prior Publication Data
US 2008/0123084 A1 May 29, 2008

(30) Foreign Application Priority Data
Nov. 29, 2006 (DE) .................. 10 2006 056 648

(51) Int. Cl.
*H01J 40/14* (2006.01)
(52) U.S. Cl. .................... 250/221; 356/222
(58) Field of Classification Search .......... 250/208.1, 250/208.2, 221, 222.1; 356/222, 400
See application file for complete search history.

(56) References Cited

U.S. PATENT DOCUMENTS 7,239,352 B2 * 7/2007 Oda et al. ................ 348/364

FOREIGN PATENT DOCUMENTS

| DE | 197 09 310 A1 | 9/1998 |
|----|---------------|--------|
| DE | 197 21 105 C2 | 11/1998 |
| DE | 199 07 548 C2 | 9/1999 |
| DE | 199 07 546 C2 | 10/1999 |
| DE | 102 39 940 A1 | 3/2004 |
| DE | 10 2004 020 628 A1 | 11/2005 |
| DE | 10 2004 025 751 A1 | 12/2005 |
| EP | 0 875 873 | 11/1998 |
| EP | 0 889 332 A1 | 1/1999 |
| EP | 1 589 355 A1 | 10/2005 |
| EP | 20 2006 012 454 U1 | 11/2006 |

\* cited by examiner

*Primary Examiner*—Kevin Pyo
(74) *Attorney, Agent, or Firm*—The Nath Law Group; Jerald L. Meyer; Stanley N. Protigal

(57) ABSTRACT

This invention concerns an optoelectronic sensor assembly (10) with at least one light emitter (20) and at least one light receiver (30) comprising a spatially resolving receiving element (40), with the receiving element (40) having an inner region (42) comprising at least one photosensitive element (45) for detecting the light beam (25) and an outer region (44) comprising at least one photosensitive element (46, 47, 48, 49) for determining the position of the light beam (25) emitted by the light emitter (20), with the outer region (44) satisfying lower sensitivity and/or bandwidth requirements than the inner region (42).

21 Claims, 2 Drawing Sheets

OPTOELECTRONIC SENSOR

Figure 1:
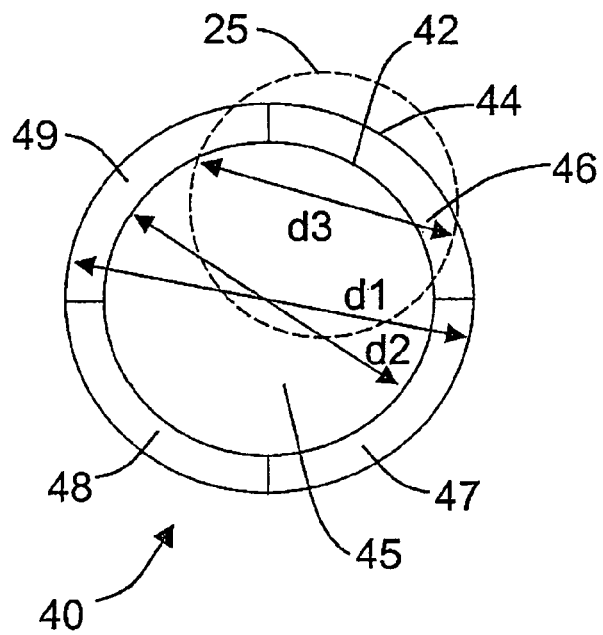

This invention concerns an optoelectronic sensor in accordance with the primary concept of claim 1.

Optoelectronic sensors with at least one light emitter and at least one light receiver having a receiving element, in particular a photosensor or an optical grid for monitoring whether items or persons have intruded into a monitored space without permission are known. For this purpose, the light emitter emits a light beam that impinges on the light receiver. If the light beam impinges on an object or a person in the monitored space, the optical path between the light emitter and the light receiver is interrupted and the light receiver generates a warning signal. It is necessary for the light beam emitted by the light emitter to strike the light receiver fully and to be received by it. To be independent of an exact alignment between the light emitter and the light receiver, the receiving element of the light receiver is designed to be considerably larger than the cross section of the light beam so as to also be able to compensate for misalignments and tolerances and to enable the light receiver to detect the entire light beam even if the alignment of the emitted light beam is inexact. However, large receiving elements are associated with high costs. Furthermore, the alignment of the light emitter with the light receiver must be performed manually, which often means a considerable expenditure of time and nevertheless makes accurate alignment more difficult.

Spatially resolving receiving elements, by means of which the position of the light spot of the incident light beam on the receiving element can be determined, are also known. Changes in the position of the light spot on the receiving element can, e.g., be determined in order to identify and differentiate reflections from objects located outside the monitored space. For this purpose, the receiving element is configured with multiple similar photosensitive elements, which are for example arranged as a matrix assembly, or it is configured as a position sensitive detector (PSD). A sensor with such a spatially resolving receiving element is for example known from EP 0 875 873 B1.

In this sensor as well, the receiving element has a large area so as to receive the incident light beam reliably, which is associated with high costs.

DE 199 07 548 C2 reveals an optoelectronic device in which the receiving element is divided into several segments, in particular a central segment and several external segments, arranged about the central segment, with the external segments being used for alignment, and all of the received light impinges on the central segment of the receiving element. This sensor also has a large photosensitive area so as to be able to detect and reliably align the incident light beam, which leads to high costs.

The object of this invention therefore consists of providing an optoelectronic sensor that is easy to assemble and can be produced economically The object of this invention is achieved by an optoelectronic sensor with the characteristics features of claim 1.

Advantageous embodiments and further configurations of this invention are disclosed in the subordinate claims.

The spatially resolving receiving element of the light receiver has an inner region with at least one photosensitive element for detecting the light beam emitted by the light emitter and an outer region immediately adjacent thereto with at least one photosensitive element for checking the position of the light beam. The actual detection of the light beam by the light receiver for purposes of the regular function of the optoelectronic sensor thus occurs in the inner region of the receiving element, while the outer region essentially serves the purpose of aligning the optoelectronic sensor during assembly and/or for control during its operation. The assembly and adjustment of the light emitter and light receiver are simplified considerably by the separation into an inner region and an outer region. The nominal position can be readily determined in that the maximum intensity of the light beam emitted by the light emitter is detected in the inner region and the outer region essentially detects no signal or only a minimum signal. The signals detected by both the inner and the outer regions can thus be employed for the alignment. According to this invention, the outer region can satisfy lower sensitivity and/or bandwidth requirements than the inner region. It preferably has a lower response speed and/or a lower optical sensitivity than the inner region. A high sensitivity for detecting intensity fluctuations and a high response speed or a short response time for detecting objects or persons arriving in the monitored space are required for purposes of the monitoring function in regular operation, e.g. for safety reasons. The inner region meets these requirements. The outer region is, on the other hand, essentially used for alignment and for checking. There is no need to equip the outer region with the same high performance elements as the inner region. The outer region can thus be equipped with subordinate amplifier circuits whose cost for amplifying the signals from the boundary regions can be kept low, but which meet the requirements for alignment during assembly and which satisfy control of the position of the light beam impinging on the light receiver during its operation. The production costs for the sensor are thus lowered significantly.

The inner region preferably consists of exactly one photosensitive element and the outer region of several photosensitive elements positioned around the inner region. If the light beam emitted by the light emitter is focused exactly on this photosensitive element, one photosensitive element is sufficient for purposes of detecting the light beam. Only this single photosensitive element is connected and operated with these high sensitivity and bandwidth requirements, which further reduces production costs.

The diameter of the outer region is advantageously larger than the diameter of the inner region by less than 20% of the diameter of the inner region. The outer region is thus designed to be particularly narrow, whereby the surface area of the receiving element becomes smaller so that further material and production cost savings can be achieved. However, such a narrow outer region is sufficient to make it possible to determine whether the light ray has already reached its nominal position in performing the alignment or during tests or whether a deviation from the nominal position exists.

The diameter of the inner region is advantageously sufficiently larger than the diameter of the light spot of the light beam impinging on the receiving element for the light spot of the light beam to be entirely received by the inner region of the receiving element when the light emitter deviates by at most +/−2.5° with respect to its optical axis. The diameter of the light spot is determined by the focused beam without counting scattered light. In selecting the size of the receiving element or of the inner region it must, on the one hand, be ensured that the light spot can be detected reliably even if it is displaced, for which reason the inner region is selected to be as large as possible. On the other hand, material costs increase considerably the larger the inner region is configured to be. The dimensioning of the diameter of the inner region described above ensures that, when displacements of the light spot within error tolerances occur, it is still reliably detected by the inner region while the size of the inner region is kept as small as possible so as to the keep material costs as low as possible. The angle specification of at most 2.5° for the deviation of the light emitter with respect to its optical axis mirrors the original operating surface area of the sensor. Furthermore, it is only the inner region that represents the actual security-related sensor technology of the receiving element while the outer region only represents an auxiliary sensor technology, so that it must be ensured that, at least with a small deviation of the light emitter with respect to its optical axis, reliable detection by means of the inner region is possible and therefore as much energy in the original operating area as possible falls on the inner region of the receiving element.

In one embodiment of this invention, the spatially resolving receiving element is formed by a matrix arrangement of photosensitive elements. The inner region is formed by one or more photosensitive elements of the inner matrix and the outer region of adjacent elements. In an alternative advantageous embodiment of this invention, the inner region of the spatially resolving receiving element is formed by a circular disk-shaped photosensitive element and the outer region of the spatially resolving receiving element is formed by annular segment-shaped photosensitive elements around the circular disk-shaped photosensitive element. Both embodiments ensure that a deviation in the nominal position of the light beam impinging on the light receiver in any direction is detected by the adjacent photosensitive elements.

In the second embodiment, the outer region preferably comprises four annular segment-shaped photosensitive elements in four quadrants, because this is already sufficient to detect deviations in the nominal position and their angular direction. However, costs for signal processing and thus production costs as well remain low.

The photosensitive elements of the inner and outer regions can be semiconductor elements that are arranged in an array. However, the entire receiving element can similarly be configured as a position-sensitive detector (PSD) consisting of a semiconductor element, in a particular a silicon element, if the dimensions allow this.

The signals of each photosensitive element can preferably be analyzed separately so as to be able to determine the position and the direction of the deviation of the incident light beam from the nominal position based on the signals detected by the individual photosensitive elements. One means for determining the position of the light beam is advantageously provided, whereby the ratios between the individual signals generated by the photosensitive elements are calculated to make it possible to draw conclusions from these ratios about the direction of the deviation of the incident light beam from the nominal position.

The separate analysis of the signals from each photosensitive element and preferably the calculation of the ratios of the signals of each photosensitive element can in particular be used during assembly of the light receiver to align the receiving element with the receiving optics. In a further advantageous embodiment of this invention means are provided that analyze the signals detected by the individual photosensitive elements and which use these signals for aligning the receiving optics with the receiving element. For example, the receiving element can carry one or two motor-controlled tilting devices, which are displaced as a function of the detected signals so as to make it possible to align the receiving element along one or two axes. The receiving element is thus automatically aligned as a function of the signals detected by the individual photosensitive elements so that a manual adjustment of the light receiver is omitted, which increases the accuracy of the alignment and simplifies assembly considerably.

In a particularly preferred embodiment of this invention, several light emitters and several light receivers, which are arranged in an optical grid configuration, are provided. It is particularly in an optical grid configuration that the light receivers consisting of receiving elements having an inner and an outer region offer particular benefits in terms of alignment and assembly of the individual light receivers because they can very simply determine whether the light received by a certain light receiver comes from the light emitter associated with it and not from scattered light or light from an adjacent misaligned light emitter.

This invention is described in detail using the following figures, which show

Figure 2:
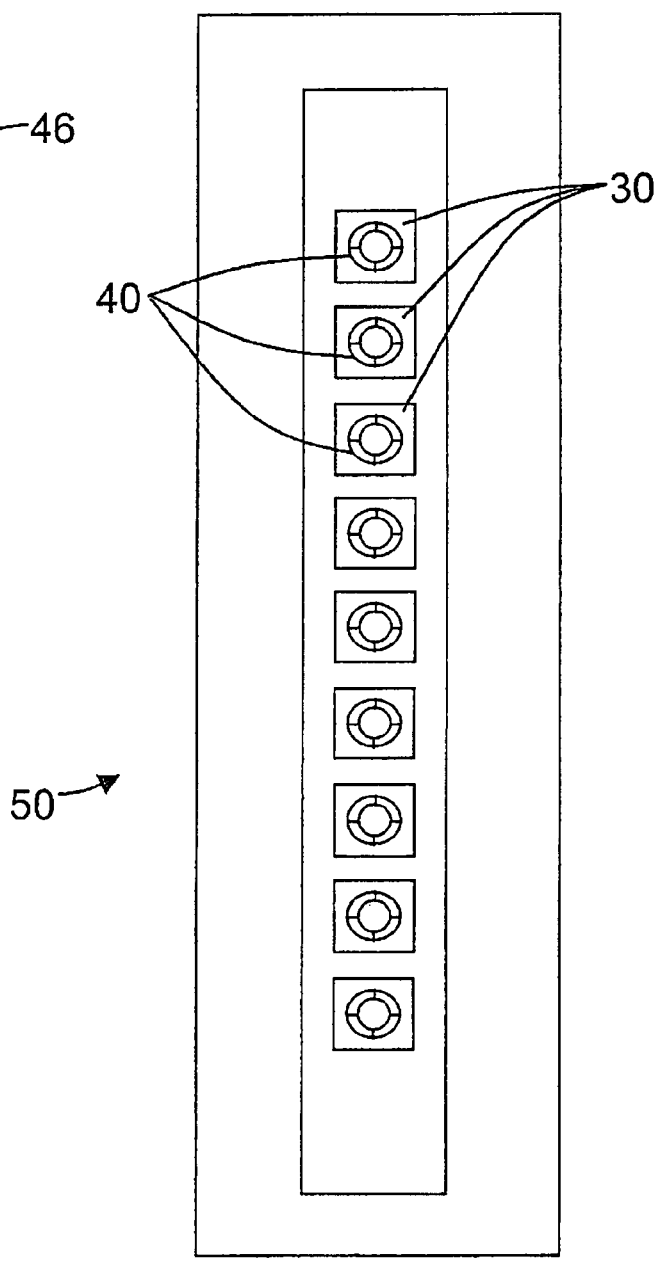
Figure 3:
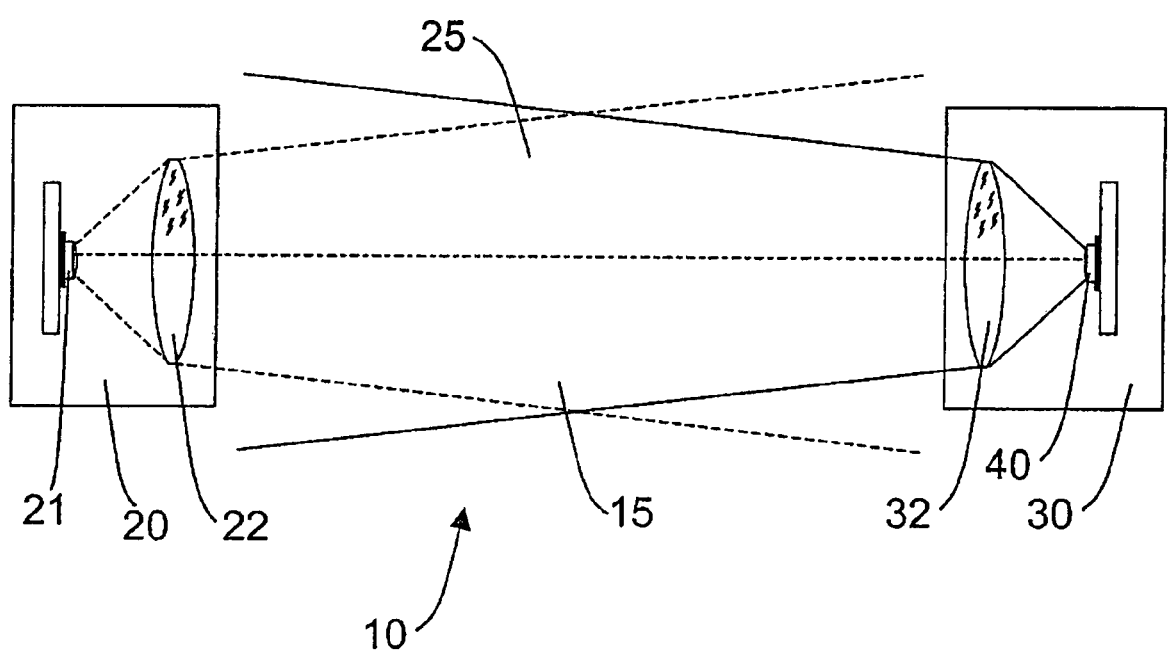

FIG. 1 a schematic representation of an embodiment of a receiving element of this invention, FIG. 2 a schematic representation of an embodiment of an optical grid configuration, and FIG. 3 a schematic representation of an embodiment of an optoelectronic sensor.

FIG. 3 shows an optoelectronic sensor assembly 10 with a light emitter 20 and a light receiver 30. The light emitter 20 and the light receiver 30 are located on opposite sides of a monitored space 15. In an embodiment of this invention which is not shown, the light emitter 20 and the light receiver 30 can also be located on the same side of the monitored space 15, while a reflector, which reflects the light emitted by the light emitter 20 into the light receiver 30, is located on the opposite side. The light emitter 20 comprises an LED 21 or some other light source that emits a light beam 25, which is bundled by means of transmission optics 22. The emitted light beam 25 emitted by the light emitter 20 is preferably focused by means of the receiving optics 32 as a light spot on the receiving element 40 located in the focus of the receiving optics 32 of the light receiver 30.

One embodiment of the receiving element 40 is represented in FIG. 1. The receiving element 40 comprises an inner region 42 and an immediately adjacent outer region 44, with the inner region 42 serving the purpose of detecting the light beam 25 and the outer region 44 the purpose of checking the position of the light spot of the light beam 25 emitted onto the receiving element 40 by the light emitter 20. For this purpose, the inner region 42 comprises at least one photosensitive element 45 and the outer region 44 at least one photosensitive element 46, 47, 48, 49 of the outer region 44, with the photosensitive elements 46, 47, 48, 49 being arranged around the photosensitive element 45 of the inner region 42. The inner region 42 preferably consists of exactly one photosensitive element 45. In the preferred embodiment represented in FIG. 1, the inner region 42 consists of a circular disk-shaped photosensitive element 45, while the outer region 44 consists of four annular segment-shaped photosensitive elements 45, each of which extends over a quadrant, and which form an annulus enclosing the inner region 42. The photosensitive elements 45, 46, 47, 48, 49 are for example Si photodiodes that detect the incident light and convert it to photocurrents. The photodiodes can be configured as an array on a Si chip. It is also possible to configure the entire receiving element 40 as a position sensitive detector (PSD) and to differentiate the elements 45, 46, 47, 48, 49 via the PSD contacts. In an alternative embodiment, which is not represented, the photosensitive elements can for example also be configured in the form of a matrix in which the photosensitive elements are arranged in lines and columns, with some of the photosensitive elements on the inside of the matrix forming the inner region and the remaining external photosensitive elements forming the outer region.

The outer region 44 has a diameter d1 and the inner region 42 a diameter d2, with the diameter d1 of the outer region 44 being larger than the diameter d2 of the inner region 42 by less than 20% of the diameter d2 of the inner region 42. The outer region 44 is thus comparatively narrow, which, however, is sufficient to register deviations of the light spot of the incident light beam 25 from its nominal position.

The light spot of the light beam 25 has a diameter d3, with the diameter d2 of the inner region 42 exceeding the diameter d3 of the light spot of the light beam 25 impinging on the receiving element 40 sufficiently to allow the light spot of the impinging light beam 25 to be fully detected on the receiving element 40 of the inner region 42 upon a deviation of the light emitter of at most 2.5° with respect to its optical axis. Deviations from the nominal position are thus tolerated in terms of error tolerances, while the inner region 42 is nevertheless configured to be sufficiently small to produce no unnecessary material or production costs.

The inner region 42 including the photosensitive element 45 serves the purpose of detecting the light beam 25 emitted by the light emitter 20 during operation of the optoelectronic sensor assembly 10. The electronics installed behind the element 45, in particular the added amplifier circuit, exhibit a high sensitivity and a large bandwidth so that signals from the photosensitive element 45 can be analyzed with fast rise times and a short response time is guaranteed for the monitoring function. Because an accurate alignment based on the alignment of the receiving element 40 with respect to the light emitter 20 described below is possible, the inner region 42 including the photosensitive element 45 can be dimensioned as described above so that its diameter d2 is slightly larger than the diameter d3 of the light spot of the incident light beam 25 on the receiving element 40 and can compensate for error tolerances of the alignment. However, it is not necessary to design the inner region and thus the photosensitive element 45 located in the inner region 42 with a substantially larger surface area. This leads to savings in expensive semiconductor material.

The photosensitive elements 46, 47, 48, 49 located in the outer region 44 serve the purpose of aligning the light receiver 30 during the production of the optoelectronic sensor assembly 10. For this purpose, a light beam emitted by the light emitter is focused on the receiving element 40 by the receiving optics 32 during assembly. No exact alignment between the receiving optics 32 and the receiving element 40 of the light receiver 30 exists initially, so that the light spot of the light beam 25 falls partly on the inner region 42 and partly on the outer region 44, as is indicated, for example, in FIG. 1 by means of the dashed line. Each of the five photosensitive elements 45, 46, 47, 48, 49 of the receiving element 40 can be analyzed separately. Consequently, the photosensitive element 45 in the inner region 42 is only partly illuminated, while the photosensitive element 46 in the outer region 44 is almost completely illuminated and the adjacent photosensitive elements 47, 49 are only slightly illuminated. Based on this and in particular based on the ratios calculated using the signals detected by the individual photosensitive elements 45, 46, 47, 48, it is possible to draw conclusions about the position of the light spot, and the receiving optics 32 and the receiving element 40 can be aligned into the nominal position according to this deviation until the inner region 42 is illuminated with maximum intensity and the elements 46, 47, 48, 49 of the outer region 44 are each illuminated with equal minimum intensities. In particular, the ratios of the signals of the individual photosensitive elements 45, 46, 47, 48 are all the same when the nominal position is reached. While the photosensitive element 45 located in the inner region 42 must meet demanding requirements in terms of sensitivity and bandwidth and/or response time, the photosensitive elements 46, 47, 48, 49 in the outer region 44 used for alignment or also for tests performed at certain time intervals during operation can be wired with modest and thus more economical electronics.

In a particularly preferred embodiment of this invention, means that are not represented are provided which control the mutual alignment of the receiving optics 32 and the receiving element 40 by analyzing the signals from the individual photosensitive elements 45, 46, 47, 48, 49 during assembly. The signals from the photosensitive elements 45, 46, 47, 48, 49 are detected; the receiving optics 32 and the receiving element 40 are automatically moved with respect to one another as a function of the detected signals, in particular as a function of the ratios calculated from the signals, until the light spot of the light beam 25 is centered on the inner region 42 of the receiving element 40, and is then fixed in the light receiver 30. To enable the displacement of the receiving element 40, it can, for example, be tilted in one or two mutually vertical axes, which are both vertical to the optical axis of the receiving elements 40, by means of a tilting device driven by one or two motors. The amount by which the tilting device is tilted is determined as a function of the detected signals. The assembly of the light receiver 30 is automated and thus substantially simplified in this way.

In order to prevent a misalignment of the optoelectronic sensor during operation in which the light beam 25 is focused on the inner region 42, the function of determining the position of the light beam 25 is assigned to the outer region 44. The photosensitive elements 46, 47, 48, 49 located in the outer region 44 check at regular intervals whether the detected signals, which correspond to the intensity of the incident light beam 25, have changed and have exceeded a specified threshold value. If necessary, calculated ratios of the signals can also be checked as to whether they agree or deviate from each other. In this case the light spot has moved; it now also illuminates the outer region 44 and no longer completely illuminates the inner region 42. A decrease in the intensity of the light spot in the inner region 42 can not only be caused by a misalignment of the sensor, but also by increasing contamination of the surface of the light receiver, without the position of the light spot having changed. As a result of the additional assessment by means of the photosensitive elements 46, 47, 48, 49 located in the outer region 44, it is possible to differentiate between whether the light spot has moved and a realignment of the sensor is necessary or whether a simple contamination of the surface of the light receiver 30 has occurred, which requires a cleaning of the sensor 30 but not a realignment.

The light receiver 30 described above with the receiving element 40 can not only be used in optoelectronic sensor assemblies 10 that are used for monitoring monitored spaces, but it can also be used for aligning and/or positioning any parts, for example on printed circuit boards.

FIG. 2 shows a preferred embodiment of the receiving device of an optoelectronic sensor, wherein not only one light receiver 30 but several light receivers 30 and accordingly several light emitters (not shown) are used. The light emitters and light receivers 30 are in each instance arranged in a line, on one side of the monitored space and thus form an optical grid configuration 50. Such an optical grid configuration preferably uses the receiving elements 40 of the light receiver 30 in accordance with the exemplary embodiment of FIG. 1. The difficulty in the alignment of such an optical grid configuration 50 lies in the fact that the light emitted by a light emitter can impinge not only on its associated light receiver 30 but also on its adjacent light receivers 30. It is usually the case with optical grid configurations 50, which exhibit a distance of approximately 10 mm between the light emitters and the light receivers 30, that the light emitted by a light emitter has an angle of beam spread of approximately 2° and therefore irradiates several adjacent receiving elements 30. However, with optimal alignment of the optical grid configuration 50, the light emitted by a light emitter is detected in the nominal position only by the corresponding light receiver 30, while it is detected at a position deviating from the nominal position by the adjacent light receiver 30. The alignment of the light emitted by a light emitter on the corresponding light receiver is facilitated by temporal control of the light pulses emitted by the different light emitters.

Using the receiving elements 40 in accordance with the exemplary embodiment of FIG. 1 the alignment becomes particularly simple because it is possible to differentiate between an incident light beam from the precisely aligned corresponding light emitter and other incident light beams by means of the photosensitive elements located in the respective outer regions of the receiving elements 40. Furthermore, the analysis of the signals generated by the different photosensitive elements 45, 46, 47, 48 also facilitates the alignment because it likewise allows for an automated alignment of the receiving elements 30 with respect to the light emitters. To keep the cost of the automatic alignment as low as possible with, for example, an optical grid configuration having 100 light receivers at 30 per meter, it is usually sufficient to simply provide a mechanism that tilts the entire rail with the light receivers 30 so as to align it to be parallel with the corresponding rail containing the light emitters, because the optical axes of the individual light receivers 30 are usually aligned parallel to one another in a rail.

REFERENCE SYMBOL LIST

10 Optoelectronic sensor assembly
15 Monitored space
20 Light emitter
21 LED
22 Emitting optics
25 Light beam
30 Light receiver
32 Receiving optics
40 Receiving element
42 Inner region
44 Outer region
45 Photosensitive element
46 Photosensitive element
47 Photosensitive element
48 Photosensitive element
49 Photosensitive element
50 Optical grid configuration

The invention claimed is:

1. Optoelectronic sensor assembly (10) comprising at least one light emitter (20) and at least one light receiver (30) containing a spatially resolving receiving element (40), with the receiving element (40) having an inner region (42) with at least one photosensitive element (45) for detecting the light beam (25) and an outer region (44) with at least one photosensitive element (46, 47, 48, 49) for checking the position of the light beam (25) emitted by the light emitter (20),
characterized in that the outer region (44) can meet lower sensitivity and/or bandwidth requirements than the inner region (42).

2. Optoelectronic sensor assembly according to claim 1, characterized in that the outer region (44) has a lower response speed than the inner region (42).

3. Optoelectronic sensor assembly according to claim 1, characterized in that the outer region (44) has a lower optical sensitivity than the inner region (42).

4. Optoelectronic sensor assembly according to claim 1, characterized in that the inner region (42) consists of exactly one photosensitive element (45) and the outer region (44) of several photosensitive elements (46, 47, 48, 49) positioned around the inner region (42).

5. Optoelectronic sensor assembly according to claim 1, characterized in that the diameter (d1) of the outer region (44) is larger than the diameter (d2) of the inner region (42) by less than 20% of the diameter (d2) of the inner region (42).

6. Optoelectronic sensor assembly according to claim 1, characterized in that the diameter (d2) of the inner region (42) is sufficiently larger than the diameter (d3) of the light spot of the light beam (25) impinging on the receiving element (40) for the light spot of the light beam (25) impinging on the receiving element (40) to still fall entirely on the inner region (42) with a deviation of the light emitter of at most 2.5°, with respect to its optical axis.

7. Optoelectronic sensor assembly according to claim 1, characterized in that the receiving element (40) consists of a matrix arrangement of photosensitive elements.

8. Optoelectronic sensor assembly according to claim 1, characterized in that the inner region (42) of the receiving element (40) consists of a circular disk-shaped photosensitive element (45) and the outer region (44) of the receiving element (40) consists of photosensitive elements (46, 47, 48, 49) in an annular segment shaped arrangement positioned around the circular disk-shaped photosensitive element (45).

9. Optoelectronic sensor assembly according to claim 8, characterized in that the outer region (44) consists of four annular segment-shaped photosensitive elements (46, 47, 48, 49).

10. Optoelectronic sensor assembly according to claim 1, characterized in that the photosensitive elements (46, 47, 48, 49) are configured as a photodiode array.

11. Optoelectronic sensor assembly according to claim 1, characterized in that the photosensitive elements (46, 47, 48, 49) are regions of a receiving element (40) configured as a position-sensitive detector.

12. Optoelectronic sensor assembly according to claim 1, characterized in that each photosensitive element (45, 46, 47, 48, 49) generates signals that can be analyzed separately.

13. Optoelectronic sensor assembly according to claim 12, characterized in that means for determining the position of the light beam (25) are provided that calculate the ratios of the individual signals generated by the photosensitive elements (45, 46, 47, 48, 49).

14. Optoelectronic sensor assembly according to claim 12, characterized in that means are provided that analyze the signals generated by the individual photosensitive elements (45, 46, 47, 48, 49) and use them for aligning the receiving optics (32) and receiving element (40) during assembly of the light receiver (30).

15. Optoelectronic sensor assembly according to claim 1, characterized in that several light emitters (20) and several light receivers (30) are provided as an optical grid configuration (50).

16. Optoelectronic sensor assembly according to claim 7, characterized in that the inner region (42) of the receiving element (40) consists of a circular disk-shaped photosensitive element (45) and the outer region (44) of the receiving element (40) consists of photosensitive elements (46, 47, 48, 49)

in an annular segment shaped arrangement positioned around the circular disk-shaped photosensitive element (45).

17. Optoelectronic sensor assembly according to claim 9, characterized in that the photosensitive elements (46, 47, 48, 49) are configured as a photodiode array.

18. Optoelectronic sensor assembly according to claim 9, characterized in that the photosensitive elements (46, 47, 48, 49) are regions of a receiving element (40) configured as a position-sensitive detector.

19. Optoelectronic sensor assembly according to claim 13, characterized in that means are provided that analyze the signals generated by the individual photosensitive elements (45, 46, 47, 48, 49) and use them for aligning the receiving optics (32) and receiving element (40) during assembly of the light receiver (30).

20. Optoelectronic sensor assembly according to claim 13, characterized in that several light emitters (20) and several light receivers (30) are provided as an optical grid configuration (50).

21. Optoelectronic sensor assembly (10) comprising at least one light emitter (20) and at least one light receiver (30) containing a spatially resolving receiving element (40), with the receiving element (40) having an inner region (42) with at least one photosensitive element (45) for detecting the light beam (25) and an outer region (44) with at least one photosensitive element (46, 47, 48, 49) for checking the position of the light beam (25) emitted by the light emitter (20), characterized in that the outer region (44) can meet lower sensitivity and/or bandwidth requirements than the inner region (42), by having a lower response speed and lower optical sensitivity than the inner region (42).

* * * * *